United States Patent
Yamashita et al.

(10) Patent No.: US 9,541,430 B2
(45) Date of Patent: Jan. 10, 2017

(54) ELECTROMAGNETIC FLOW METER HAVING AN EARTH RING WITH A RING PLATE PART AND A WALL PART FORMED ALONG AN OUTER PERIPHERY

(71) Applicant: YOKOGAWA ELECTRIC CORPORATION, Musashino-shi, Tokyo (JP)

(72) Inventors: Hideaki Yamashita, Musashino (JP); Yoichi Imai, Musashino (JP); Yoshihiko Kuroki, Musashino (JP); Koji Omura, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/644,741

(22) Filed: Mar. 11, 2015

(65) Prior Publication Data
US 2015/0260554 A1    Sep. 17, 2015

(30) Foreign Application Priority Data

Mar. 12, 2014 (JP) ................................. 2014-049077

(51) Int. Cl.
*G01F 1/58* (2006.01)
*F16L 23/02* (2006.01)
*F16L 23/18* (2006.01)

(52) U.S. Cl.
CPC .................. *G01F 1/58* (2013.01); *F16L 23/02* (2013.01); *F16L 23/18* (2013.01); *G01F 1/586* (2013.01)

(58) Field of Classification Search
None
See application file for complete search history.

(56) References Cited

U.S. PATENT DOCUMENTS

| 5,458,003 A | * | 10/1995 | Ishihara | .................. G01P 5/086 |
| | | | | 73/861.08 |
| 7,895,902 B2 | * | 3/2011 | Iijima | ...................... G01F 1/58 |
| | | | | 73/861.11 |
| 8,082,803 B2 | * | 12/2011 | Iijima | ...................... G01F 1/58 |
| | | | | 73/861.11 |

(Continued)

FOREIGN PATENT DOCUMENTS

EP         0554059 A2    8/1993
JP      56-170718 U    5/1980
(Continued)

OTHER PUBLICATIONS

Extended European Search Report, dated Aug. 14, 2015, from the European Patent Office in counterpart European Application No. 15158663.3.

*Primary Examiner* — Harshad R Patel
(74) *Attorney, Agent, or Firm* — Sughrue Mion, PLLC

(57) ABSTRACT

An electromagnetic flow meter includes a measurement tube having a flange part, the flange part being configured to be coupled to a piping-side flange by a bolt fastening, a lining material configured to cover an inside of the measurement tube and an inner periphery area having a predetermined diameter of a coupling-side surface of the flange part, and an earth ring configured to be placed between the flange part and the piping-side flange. The earth ring has a ring plate part and a wall part formed along an outer periphery of the ring plate part.

17 Claims, 15 Drawing Sheets

(56) References Cited

U.S. PATENT DOCUMENTS

| | | | | |
|---|---|---|---|---|
| 2004/0149046 | A1* | 8/2004 | Yamazaki | ............... G01F 1/588 |
| | | | | 73/861.12 |
| 2011/0314931 | A1* | 12/2011 | Iijima | ..................... G01F 1/588 |
| | | | | 73/861.12 |
| 2015/0114133 | A1* | 4/2015 | Kerrom | ..................... G01F 1/58 |
| | | | | 73/861.11 |

FOREIGN PATENT DOCUMENTS

| JP | 02-278124 A | 11/1990 |
|---|---|---|
| JP | 08178719 A | 7/1996 |
| JP | 2007009986 A | 1/2007 |
| JP | 2010-151648 A | 7/2010 |

\* cited by examiner

ELECTROMAGNETIC FLOW METER HAVING AN EARTH RING WITH A RING PLATE PART AND A WALL PART FORMED ALONG AN OUTER PERIPHERY

CROSS-REFERENCE TO RELATED APPLICATION

The present application claims priority from Japanese Patent Application No. 2014-049077 filed on Mar. 12, 2014, the entire content of which is incorporated herein by reference.

BACKGROUND

Technical Field

The present disclosure relates to an electromagnetic flow meter, and more particularly, to a technology of suppressing deformation of a lining material configured to cover an inside of a measurement tube.

Related Art

Since an electromagnetic flow meter configured to measure a flow rate of conductive fluid by using electromagnetic induction is robust and has high precision, it is widely used for an industrial use. The electromagnetic flow meter is configured to enable the conductive fluid to be measured to flow into a measurement tube, to which a magnetic field is applied in an orthogonal direction, and to measure a generated electromotive force. Since the electromotive force is proportional to a flow rate of the fluid to be measured, it is possible to obtain a volumetric flow rate of the fluid to be measured on the basis of the measured electromotive force.

In the electromagnetic flow meter, the measurement tube having an electrode for electromotive force measurement and the like attached thereto is coupled to a piping mounted to a plant and the like, and is classified into a flange type and a wafer type, depending on a coupling structure thereof. In the flange type, the measurement tube of the electromagnetic flow meter is formed with a large flange and a bolt is enabled to pass through a flange of the piping and the flange of the measurement tube, so that the measurement tube is coupled to the flange of the piping. In the wafer type, the measurement tube of the electromagnetic flow meter is formed with a small flange and is coupled to a flange of the piping without enabling a bolt to pass through the flange of the measurement tube.

FIG. 13 illustrates a coupling structure of a flange-type electromagnetic flow meter to a piping. As shown in FIG. 13, an electromagnetic flow meter 200 has a converter 210 and a measurement tube 220, and both ends of the measurement tube 220 are formed with flange parts 221. The respective flange parts 221 are coupled to piping-side flange parts 311 by bolts 321 and nuts (not shown).

When coupling the electromagnetic flow meter-side flange part 221 and the piping-side flange part 311, they are tightened by the bolt 321 and the nut with an earth ring 222 and a gasket 312 being sandwiched therebetween. The gasket 312 is used to secure liquid tightness of the coupled part. The earth ring 222 is a circular metal plate (ring plate) having a round hole perforated therethrough and corresponding to a size of the piping and is used to equalize an earth of a fluid to be measured and a common potential.

As shown in FIG. 14, in a wafer-type electromagnetic flow meter, a flange part 241 of a measurement tube 240 has a smaller diameter and a bolt 342 is not enabled to pass through the flange part 241 of the measurement tube 240. For this reason, the measurement tube 240 is fixed by being sandwiched between both piping-side flange parts 341 which are fastened by bolts. At this time, a centering device 344 for positioning may be used.

Also in the wafer-type electromagnetic flow meter, when coupling the electromagnetic flow meter-side flange parts 241 and the piping-side flange parts 341, they are tightened by bolts 342 and nuts with earth rings 242 and gaskets 343 being sandwiched between the electromagnetic flow meter-side flange parts 241 and the piping-side flange parts 341.

FIG. 15 is a sectional view of the coupled part between the electromagnetic flow meter-side flange part 241 and the piping-side flange part 311. Here, the flange-type electromagnetic flow meter is exemplified. As shown in FIG. 15, a lining material 223 is bonded or welded to an inside of the measurement tube 220 of the electromagnetic flow meter 200, including a part of an area of a coupling side of the flange part 221. The lining material 223 is used not only to secure insulation of the measurement tube 220 to the electromotive force but also to secure corrosion resistance and wear resistance of the measurement tube 220 against the fluid to be measured. The lining material 223 is selected depending on the fluid to be measured. For example, fluorine resin (PFA, PTFE), polyurethane rubber, soft natural rubber and the like may be used.

The lining material 223 is formed to cover up to an inner periphery area having a predetermined diameter of the coupling side of the flange pan 221. Therefore, when the earth ring 222 is attached from above the lining material 223 and the electromagnetic flow meter-side flange part 221 and the piping-side flange part 311 are coupled to each other, the earth ring 222 and the lining material 223 are closely contacted.

[Patent Document 1] Japanese Patent Application Publication No. 2010-151648A

In a case where the lining material 223 having high ductility such as rubber is used, when a pressure of the fluid to be measured is high, the lining material 223 is deformed to expand in an outer periphery direction due to an inner pressure, as shown in FIG. 16. When the lining material 223 is bulged in the outer periphery direction, a thickness of the lining material 223 is reduced as much as that. Therefore, a surface pressure between the earth ring 222 and the lining material 223 is lowered, so that the liquid tightness may be influenced.

From a standpoint of safety, even if the pressure of the fluid to be measured higher than a limit value on the specification is applied, the deformation of the lining material 223 is preferably suppressed so as to keep the liquid tightness.

SUMMARY

Exemplary embodiments of the invention provide an electromagnetic flow meter which can suppress a lining material from being deformed due to a pressure of a fluid to be measured.

An electromagnetic flow meter according to an exemplary embodiment comprises:

a measurement tube having a flange part, the flange part being configured to be coupled to a piping-side flange by a bolt fastening;

a lining material configured to cover an inside of the measurement tube and an inner periphery area having a predetermined diameter of a coupling-side surface of the flange part, and an earth ring configured to be placed between the flange part and the piping-side flange, wherein the earth ring has a ring plate part and a wall part formed along an outer periphery of the ring plate part.

An inner diameter of the wall part may be configured to be greater than the predetermined diameter of the coupling-side surface of the flange part covered by the lining material.

The lining material may be contacted to the wall part by deformation thereof caused due to compression, when the flange part and the piping-side flange are coupled by the bolt fastening.

The lining material may be contacted to the wall part by deformation thereof caused due to a pressure applied from a fluid to be measured, after the flange part and the piping-side flange are coupled by the bolt fastening.

An electromagnetic flow meter according to an exemplary embodiment comprises:

a measurement tube having a flange part, the flange part being configured to be coupled to a piping-side flange by a bolt fastening;

a lining material configured to cover an inside of the measurement tube and an inner periphery area having a predetermined diameter of a coupling-side surface of the flange part;

an earth ring configured to be placed between the flange part and the piping-side flange, and an annular wall ring configured to be placed between the flange part and the earth ring and having an inner diameter greater than the predetermined diameter of the coupling-side surface of the flange part covered by the lining material.

The lining material may be contacted to the wall ring by deformation thereof caused due to compression, when the flange part and the piping-side flange are coupled by the bolt fastening.

The lining material may be contacted to the wall ring by deformation thereof caused due to a pressure applied from a fluid to be measured, after the flange part and the piping-side flange are coupled by the bolt fastening.

A surface of the flange part facing the earth ring or a surface of the earth ring facing the flange part may have a recess configured to fit therein the wall ring.

An electromagnetic flow meter according to an exemplary embodiment comprises:

a measurement tube having a flange part, the flange part being configured to be coupled to a piping-side flange by a bolt fastening;

a lining material configured to cover an inside of the measurement tube and an inner periphery area having a predetermined diameter of a coupling-side surface of the flange part, and an earth ring configured to be placed between the flange part and the piping-side flange, wherein the flange part has a projection which is circumferentially formed on the coupling-side surface of the flange part to surround the lining material.

A thickness of the earth ring may be changed on a surface thereof facing the lining material.

The earth ring may be thicker at an outer peripheral part thereof than at an inner peripheral part thereof.

The thickness may be changed by a recess or projection formed at the earth ring.

According to the present invention, it is possible to suppress the lining material from being deformed due to the pressure of the fluid to be measured.

DETAILED DESCRIPTION

Figure 1:
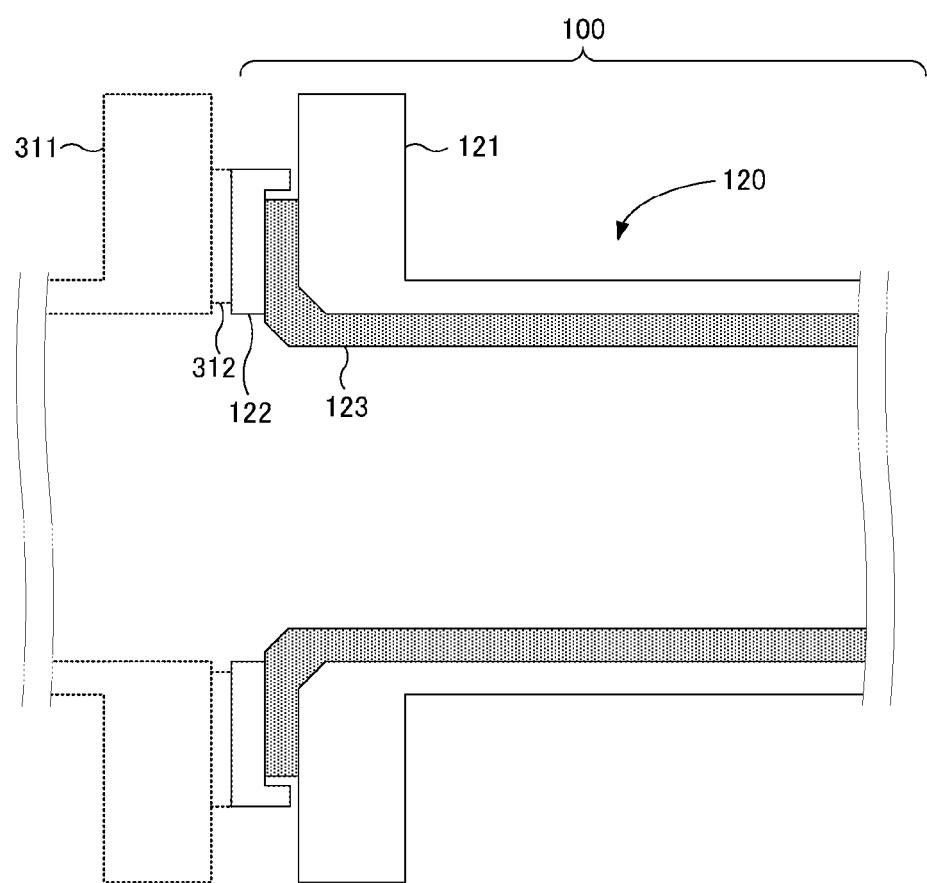
FIG. 1 is a sectional view of a coupled part between a flange part of a measurement tube of an electromagnetic flow meter according to a first exemplary embodiment of the present invention and a piping-side flange part.
Figure 13:
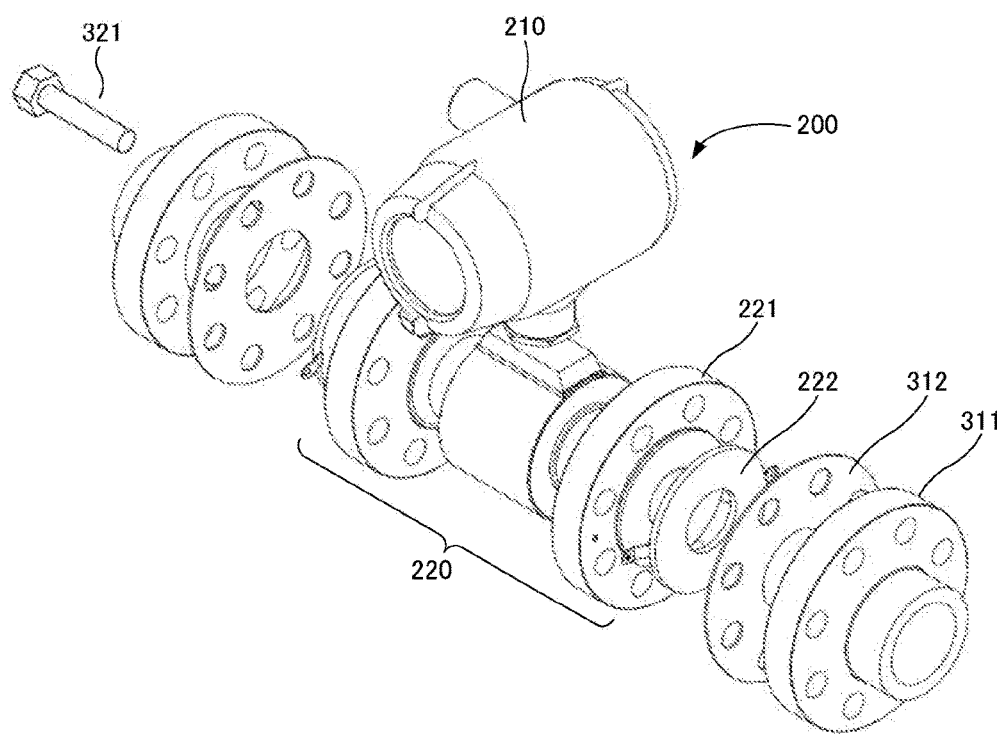
FIG. 13 illustrates a coupling structure between a flange-type electromagnetic flow meter and a piping.
Figure 14:
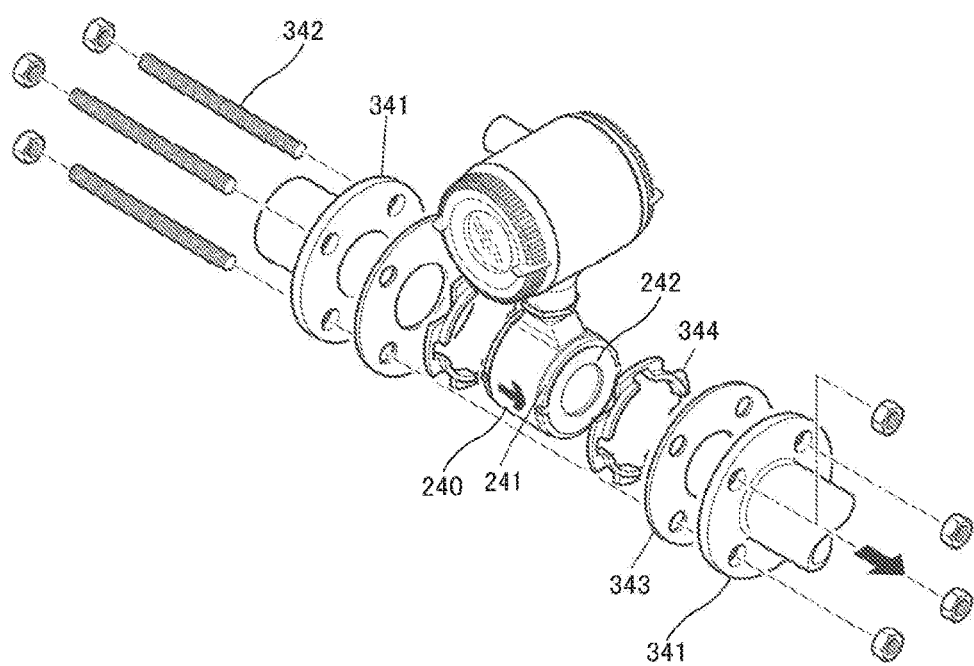
FIG. 14 illustrates a coupling structure between a wafer-type electromagnetic flow meter and a piping.
Figure 15:
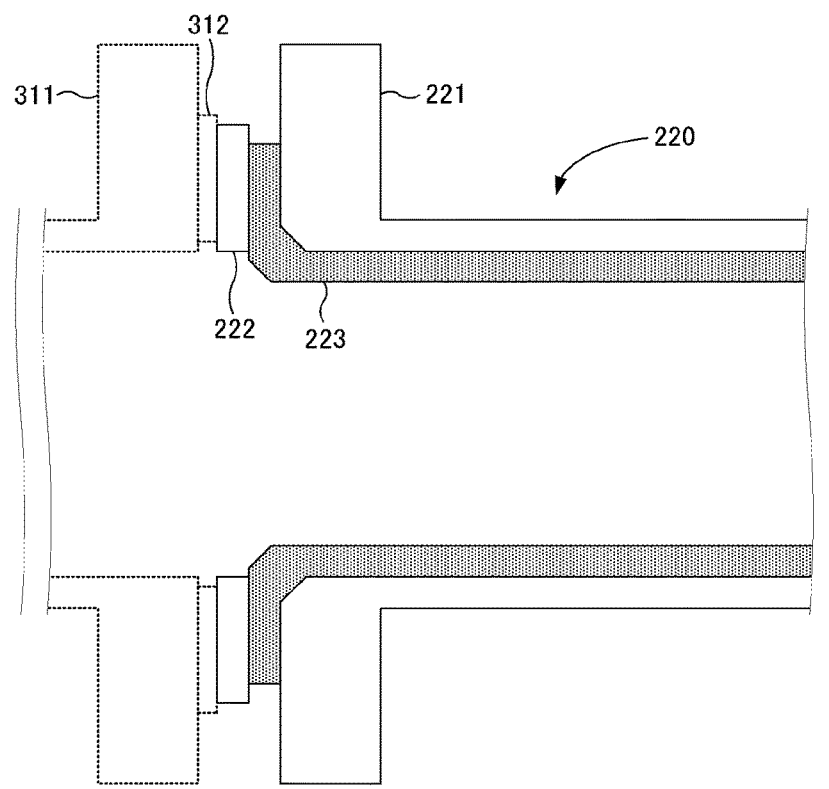
FIG. 15 is a sectional view of a coupled part between an electromagnetic flow meter-side flange part and a piping-side flange part.
Figure 16:
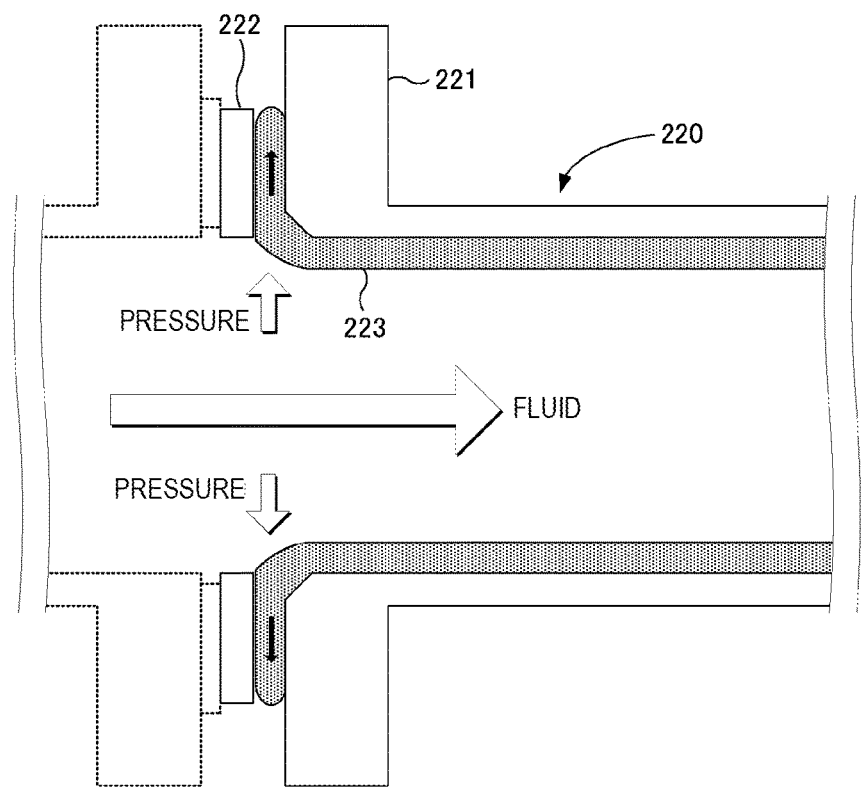
FIG. 16 illustrates deformation of a lining material in an outer periphery direction due to a pressure of a fluid to be measured.

Exemplary embodiments of the present invention will be described with reference to the drawings. FIG. 1 is a sectional view of a coupled part between a flange part 121 of a measurement tube 120 of an electromagnetic flow meter 100 according to a first exemplary embodiment of the present invention and a piping-side flange part 311. In the meantime, a coupling structure between the electromagnetic flow meter 100 and the piping may be made to be the same as the coupling structure of the related art shown in FIG. 13.

As shown in FIG. 1, a lining material 123 is bonded or welded to an inside of the measurement tube 120 of the electromagnetic flow meter 100, including a part of an area of a coupling side of the flange part 121. When coupling the electromagnetic flow meter-side flange part 121 and the piping-side flange part 311, they are tightened by a bolt and a nut (which are not shown) with an earth ring 122 and a gasket 312 being sandwiched therebetween. At this time, the earth ring 122 and the lining material 123 are surface-contacted.

Figure 2:
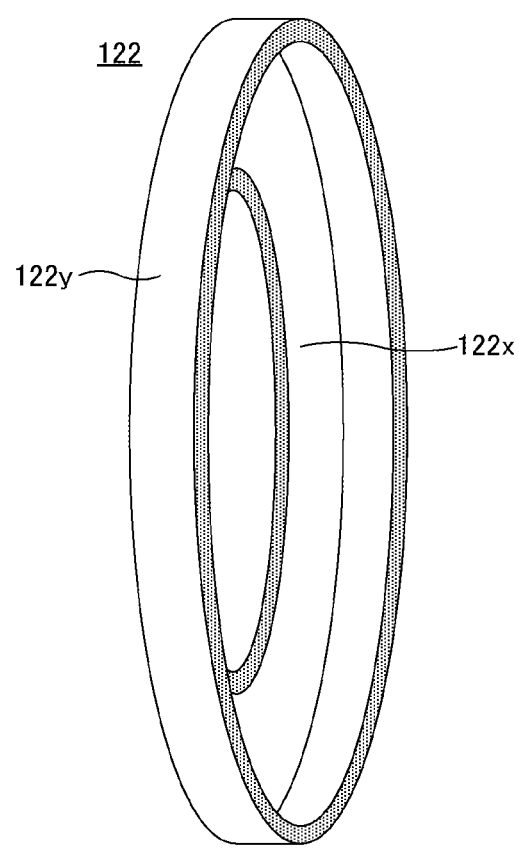
FIG. 2 illustrates an earth ring of the first exemplary embodiment.

In the first exemplary embodiment, as shown in FIG. 2, the earth ring 122 is formed with a wall part 122y along an outer periphery of a ring plate part 122x. The earth ring 122 is placed so that the wall part 122y covers the lining material 123 from an outer periphery-side with the wall part 122y being faced towards the lining material 123.

The earth ring 122 may be formed by cutting an inside of a cylindrical metal material having a height of the wall part 122y or by separately forming the ring plate part 122x and the wall part 122y and then integrating the same with an adhesive or welding.

Figure 3:
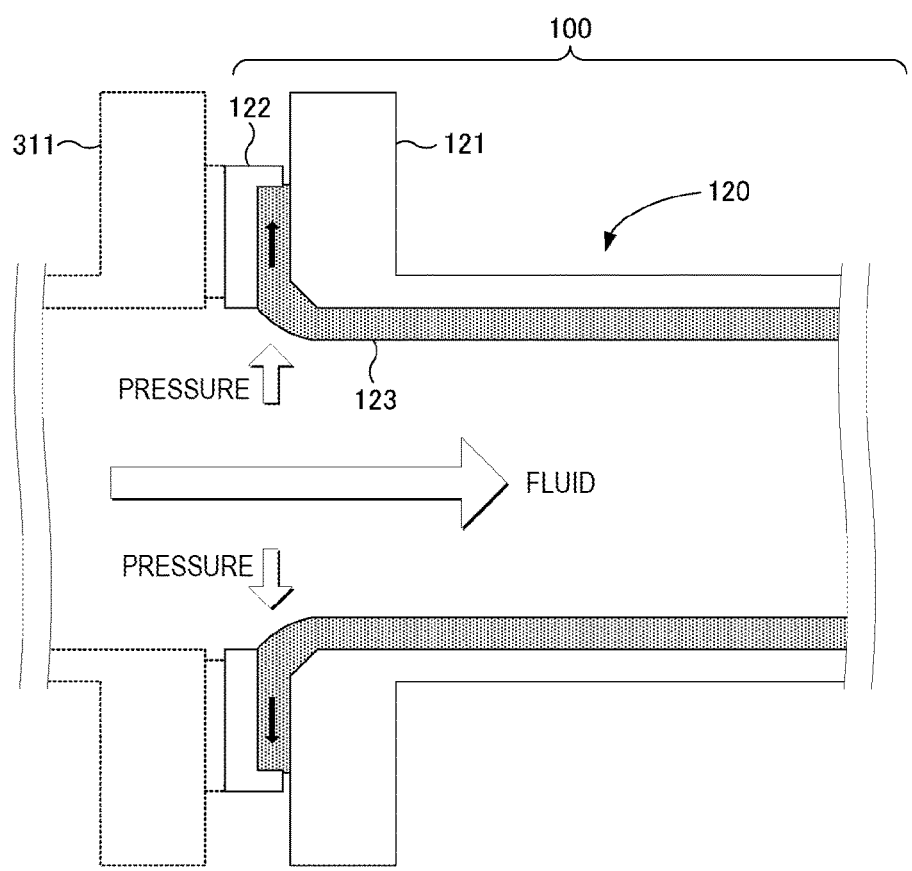
FIG. 3 illustrates a situation where deformation of a lining material in an outer periphery direction is suppressed by a wall of the earth ring.

As shown in FIG. 3, even though the lining material 123 intends to bulge out in an outer periphery direction due to a pressure of a fluid to be measured, the lining material is brought into contact with the wall part 122y of the earth ring 122 and is thus suppressed from being deformed, so that it is possible to keep a surface pressure between the lining material 123 and the earth ring 122 at a high pressure state. Thereby, a pressure resistance of a liquid tightness state is improved.

An inner diameter of the wall part 122y preferably has a size that is not contacted to the lining material 123 before the electromagnetic flow meter-side flange part 121 and the piping-side flange part 311 are coupled to each other. The reason is described. The lining material 123 saves room for deformation in the outer periphery direction when the lining material 123 is compressed by pressures from both flanges 121, 311 upon the bolt fastening by the bolt and the nut. Thereby, it is possible to reduce deformation of the lining material in an inner periphery direction, which influences the flowing of the fluid to be measured. That is, if there is no room for deformation in the outer periphery direction, the lining material 123 may be largely deformed in the inner periphery direction in which the fluid to be measured flows, which is not preferable.

On the other hand, in order to appropriately prevent the surface pressure between the lining material 123 and the earth ring 122 from being lowered due to the deformation of the lining material 123 in the outer periphery direction, the inner diameter size of the wall part 122y is set so that the wall part 122y is contacted to the lining material 123 by the compression resulting from the tightening upon the bolt fastening or is contacted to the lining material 123 at a stage where the lining material 123 is slightly deformed in the outer periphery direction due to a pressure from the fluid to be measured after the tightening. The pressure from the fluid to be measured may be a pressure which is normally assumed or a maximum pressure permitted by the electromagnetic flow meter 100 in view of its specification, or higher than them, for example.

Also, a height of the wall part 122y is set to avoid a situation where the wall part 122y is contacted to the flange part 121 at an early stage of the tightening upon the bolt fastening and the surface pressure between the lining material 123 and the earth ring 122 cannot be thus secured. That is, as shown in FIG. 3, the height of the wall part 122y is set so that a top part of the wall part 122y of the earth ring 122 is not contacted to the flange part 121 before the tightening of the bolt fastening.

Also, the height of the wall part 122y is set so that a tip of the wall part 122y is contacted to the flange part 121 at a stage where the lining material 123 is somewhat compressed resulting from the sufficient tightening, and the wall part 122y may be used as a stopper of the excessive tightening.

Figure 4:
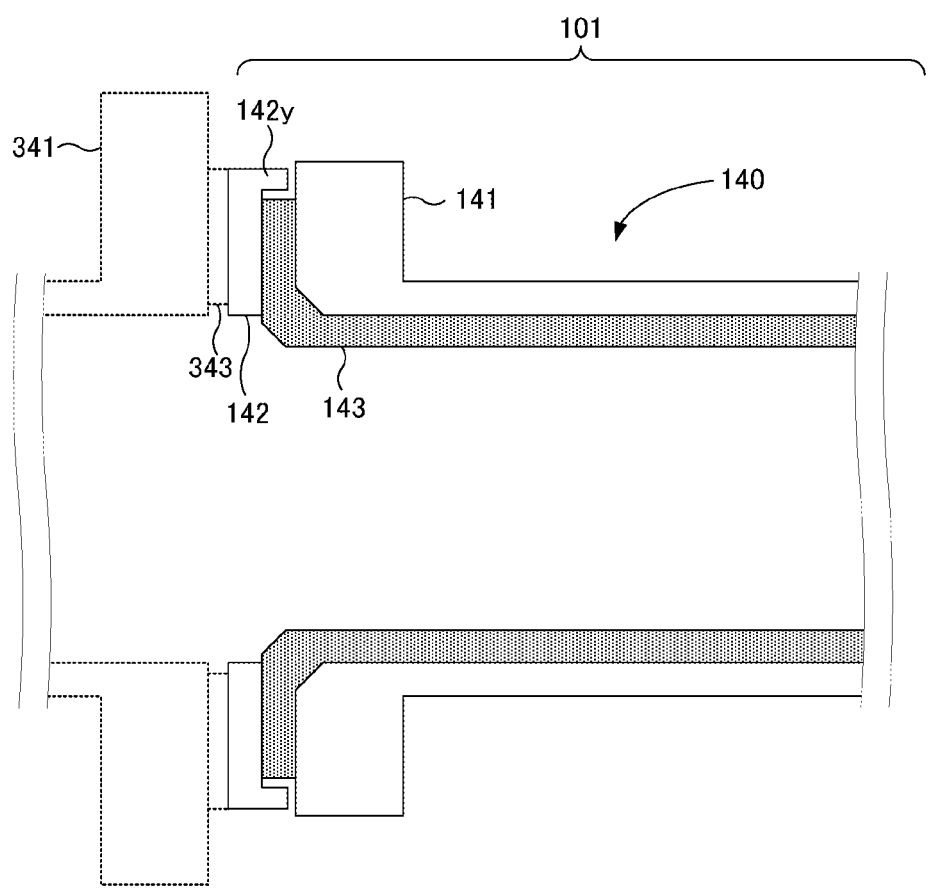
FIG. 4 illustrates a case where the present invention is applied to a wafer-type electromagnetic flow meter.

Meanwhile, in the first exemplary embodiment, the flange-type electromagnetic flow meter has been exemplified. However, the present invention can also be applied to a wafer-type electromagnetic flow meter. As shown in FIG. 4, a lining material 143 is bonded or welded to an inside of the measurement tube 140 of a wafer-type electromagnetic flow meter 101, including a part of an area of a coupling side of a flange part 141.

Here, the flange part 141 is formed to be smaller than the flange part 121 of the flange-type electromagnetic flow meter 100, a bolt is enabled to pass through an outer side of the flange part 141 and the flange part 141 and a piping-side flange part 341 are coupled by the bolt fastening, which is the same as the flange-type electromagnetic flow meter.

Also in the wafer-type electromagnetic flow meter 101, in order to suppress deformation of the lining material 143, an earth ring 142 is preferably formed with a wall part 142y. The following exemplary embodiments and modified embodiments to be described later can also be applied to the wafer-type electromagnetic flow meter.

Figure 5:
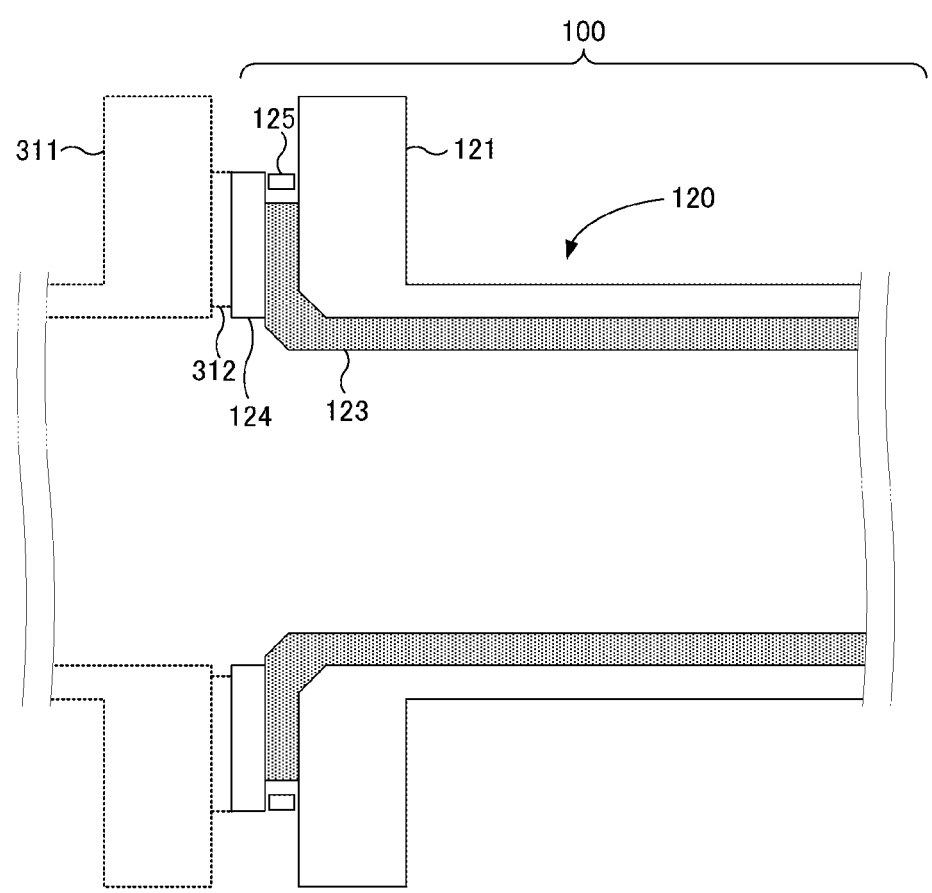
FIG. 5 is a sectional view of a coupled part between a flange part of a measurement tube of an electromagnetic flow meter according to a second exemplary embodiment of the present invention and a piping-side flange part.

Subsequently, a second exemplary embodiment of the present invention is described. FIG. 5 is a sectional view of a coupled part between the flange part 121 of the measurement tube 120 of the electromagnetic flow meter 100 according to a second exemplary embodiment of the present invention and the piping-side flange part 311. In the second exemplary embodiment, the ring plate part 122x and the wall part 122y are independently formed, and an earth ring 124 having the same ring plate shape as the related art and an annular wall ring 125 are used to suppress deformation of the lining material 123 in the outer periphery direction by the wall ring 125. An inner diameter and a thickness of the wall ring 125 can be formed in the same manner as the inner diameter and height of the wall part 122y.

Regarding the wall ring 125, a variety of thicknesses are prepared. Thereby, it is possible to easily cope with unevenness and variation in the thickness of the lining material 123. Also, even though the thickness of the lining material 123 is changed due to wear and creep over time, for example, it is possible to easily cope with the corresponding situation by replacing the wall ring 125 with a wall ring 125 having an appropriate thickness. Further, it is possible to save the manufacturing cost, as compared to the earth ring 122 having the wall part integrated thereto. As the material of the wall ring 125, a material having sufficient strength and endurance (corrosion resistance and the like) may be used and is not necessarily required to be the same as the material of the earth ring 124.

Figure 6A:
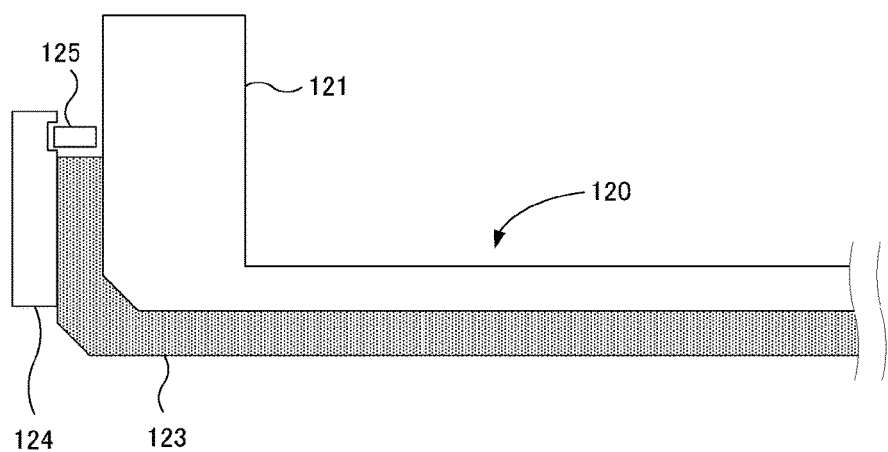
FIGS. 6A and 6B illustrate recesses for wall ring fixation.

In the second exemplary embodiment, when coupling the electromagnetic flow meter-side flange part 121 and the piping-side flange part 311, in order to fix a position of the wall ring 125, a surface of the earth ring 124 to contact the lining material 123 may be formed with a circumferential recess in which the wall ring 125 is fitted, as shown in FIG. 6A.

Figure 6B:
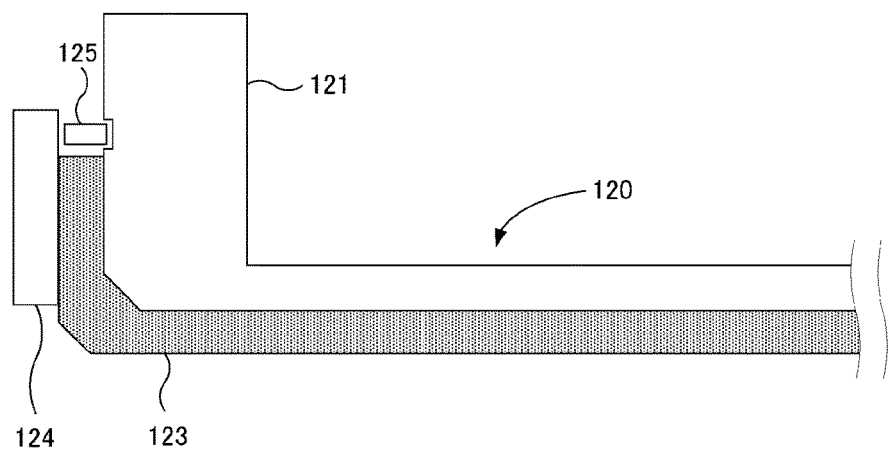

Alternatively, as shown in FIG. 6B, a surface of the flange part 121 of the measurement tube 120 to contact the lining material 123 may be formed with a circumferential recess in which the wall ring 125 is fitted. A width of the recess is arbitrary inasmuch as the wall ring 125 can be fitted in the recess. Therefore, the width of the recess may be equivalent to the width of the wall ring 125 or may be greater than the width of the wall ring 125. Meanwhile, in this case, the thickness of the wall ring 125 is determined, considering the depth of the recess.

Figure 7:
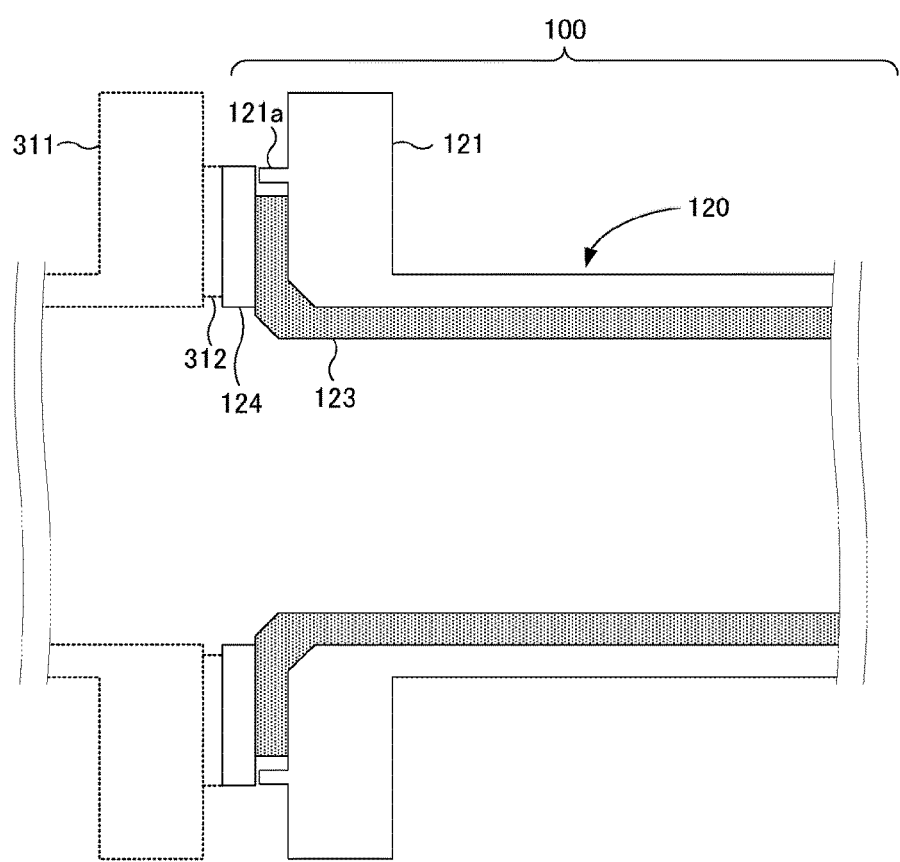
FIG. 7 is a sectional view of a coupled part between a flange part of a measurement tube of an electromagnetic flow meter according to a third exemplary embodiment of the present invention and a piping-side flange part.

Subsequently, a third exemplary embodiment of the present invention is described. FIG. 7 is a sectional view of a coupled part between the flange part 121 of the measurement tube 120 of the electromagnetic flow meter 100 according to a third exemplary embodiment of the present invention and the piping-side flange part 311. In the third exemplary embodiment, a wall for suppressing the deformation of the lining material 123 in the outer periphery direction is provided for the flange part 121 of the measurement tube 120.

That is, a projection 121a configured to surround the lining material 123 is circumferentially formed on a surface of the flange part 121 to contact the lining material 123. A size, an inner diameter and a height of the projection 121a may be formed in the same manner as the wall part 122y of the earth ring 122 of the first exemplary embodiment.

Subsequently, modified embodiments of the present invention are described. The following modified embodiments are applied to the first exemplary embodiment. However, the modified embodiments can also be applied to the second and third exemplary embodiments.

In the above exemplary embodiment, the surface of the ring plate part 122x of the earth ring 122 to contact the lining material 123 is flat and uniform as regards the thickness. However, in the modified embodiments, regarding the surface to contact the lining material 123, the thickness of the ring plate part 122x is changed in a diametrical direction.

The thickness of the earth ring 122 is changed on the surface thereof to contact the lining material 123. Thereby, when the electromagnetic flow meter-side flange part 121 and the piping-side flange part 311 are tightened by the bolt fastening upon the coupling, a compression rate of the lining material 123 is different depending on the places.

Figure 8:
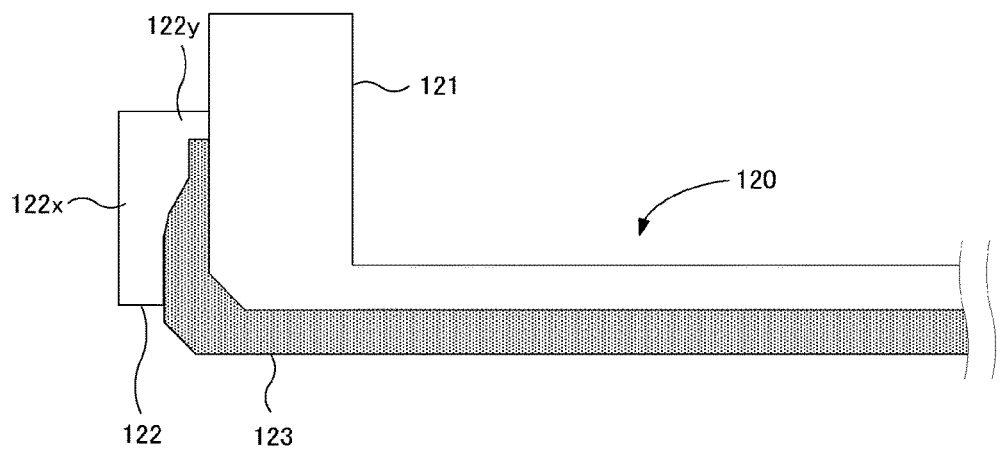
FIG. 8 illustrates a modified embodiment of the present invention.

For example, according to the earth ring 122 shown in FIG. 8, the ring plate part 122x except for the wall part 122y is configured so that a thickness of an outer peripheral part thereof is thickened and a thickness of an inner peripheral part thereof is thinned. In this case, the compression rate of the lining material 123 is high at the outer peripheral part and is low at the inner peripheral part.

In general, when the compression rate of the lining material 123 is increased, the liquid tightness is improved. However, since the excessive force is applied, the rapid deterioration is made. When the lining material 123 is deteriorated, the elastic force is lowered, so that it may be difficult to maintain the original liquid tightness. Therefore, in the modified embodiments, the thickness of the earth ring 122 is changed to change the compression rate of the lining material 123 depending on the places, so that it is possible to secure the high liquid tightness and to keep the liquid tightness for a long time. That is, the high liquid tightness is secured at the part having the high compression rate and the liquid tightness is kept for a long time at the part having the low compression rate. At this time, it is possible to somewhat keep the liquid tightness for a long time at the part having the high compression rate even though the original liquid tightness is lowered.

As shown in FIG. 8, in order to set the compression rate of the outer peripheral part of the lining material 123 to be high and the compression rate of the inner peripheral part thereof to be low, the outer peripheral part of the earth ring 122 is formed to be thick and the inner peripheral part thereof is formed to be thin. Thereby, when the lining material 123 intends to be deformed in the outer periphery direction due to the pressure of the fluid to be measured, an inclined surface resulting from the change in the thickness of the earth ring 122 serves as a resistance force together with the wall part 122y. Therefore, it is expected that the deformation of the lining material 123 in the outer periphery direction will be further suppressed.

Also, in the embodiment of FIG. 8, the thickness of the earth ring 122 is made to continuously change without an acute part. Thereby, the compression rate of the lining material 123 is optimally set at any one part and the load concentration on the lining material 123 due to a contact to an angled part can be avoided.

Figure 9:
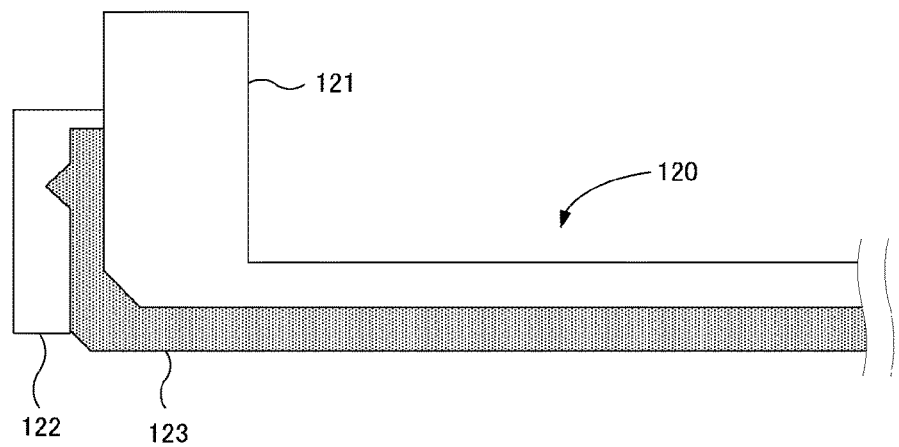
FIG. 9 illustrates a modified embodiment of the present invention.

The change in the thickness of the earth ring 122 is not limited to the embodiment of FIG. 8. For example, as shown in FIG. 9, the earth ring 122 may be formed with a triangular recess. In this case, the compression rate of a part of the lining material 123 corresponding to the recess is lowered. The thickness change may be a linear shape, a curved shape or a combination thereof.

Figure 10:
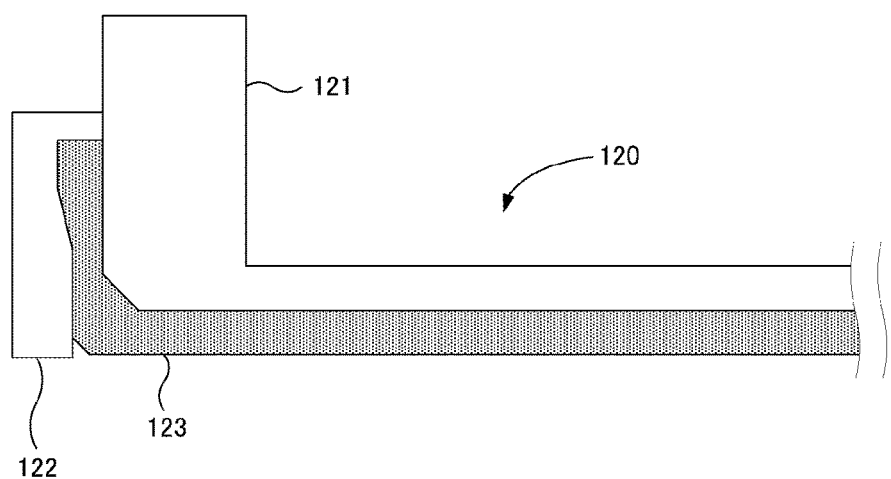
FIG. 10 illustrates a modified embodiment of the present invention.

Also, as shown in FIG. 10, the outer peripheral part of the earth ring 122 may be thinned and the inner peripheral part thereof may be thickened. In this case, the compression rate of the lining material 123 is low at the outer peripheral part and is high at the inner peripheral part.

Figure 11A:
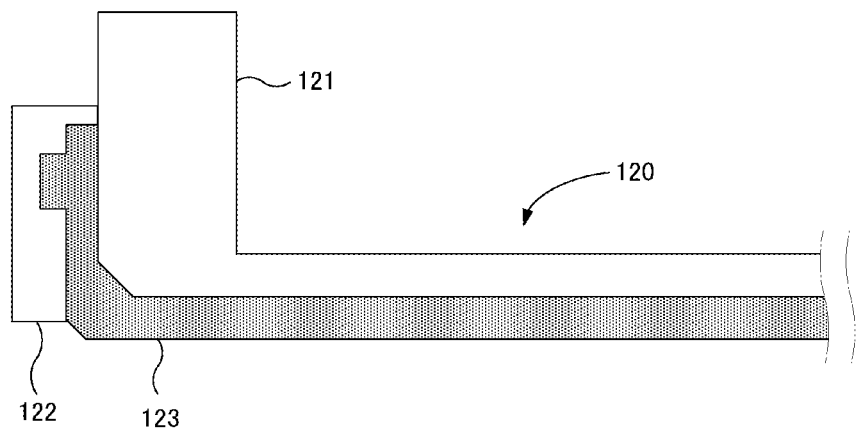
FIGS. 11A to 11C illustrate modified embodiments of the present invention.
Figure 11B:
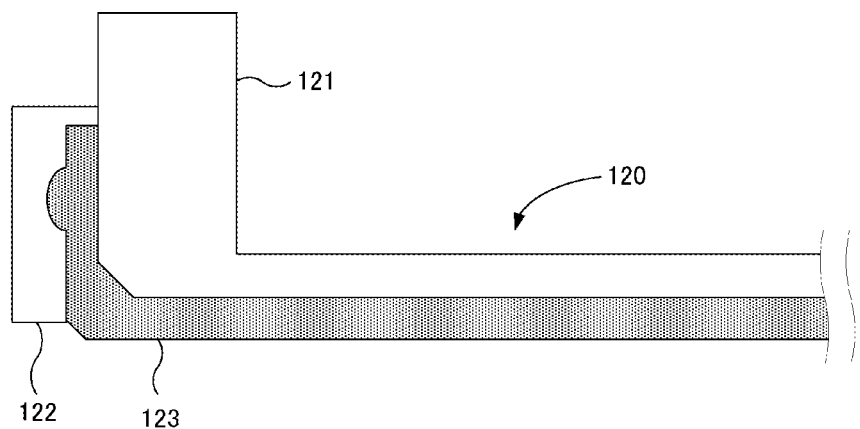
Figure 11C:
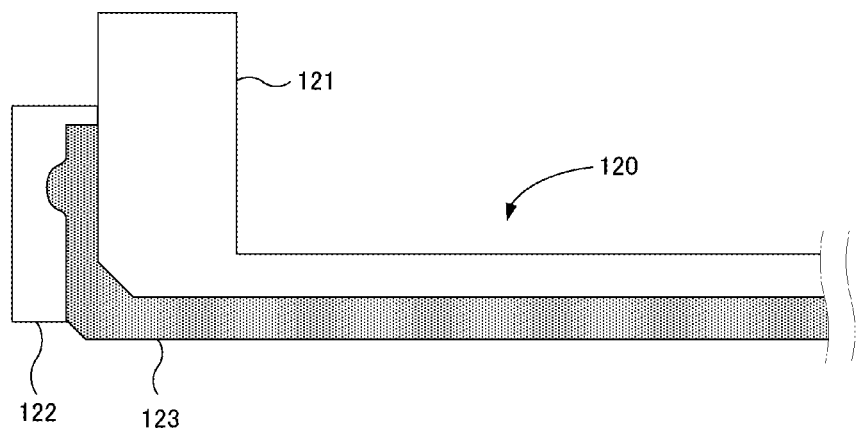

Further, as shown in FIGS. 11A to 11C, the earth ring 122 may be formed with recesses having various shapes. Specifically, the earth ring 122 may be formed with a rectangular recess (FIG. 11A), a semi-circular recess (FIG. 11B) or a recess having other shape (FIG. 11C). In this case, the compression rate of a part of the lining material 123 corresponding to the recess is lowered.

Figure 12A:
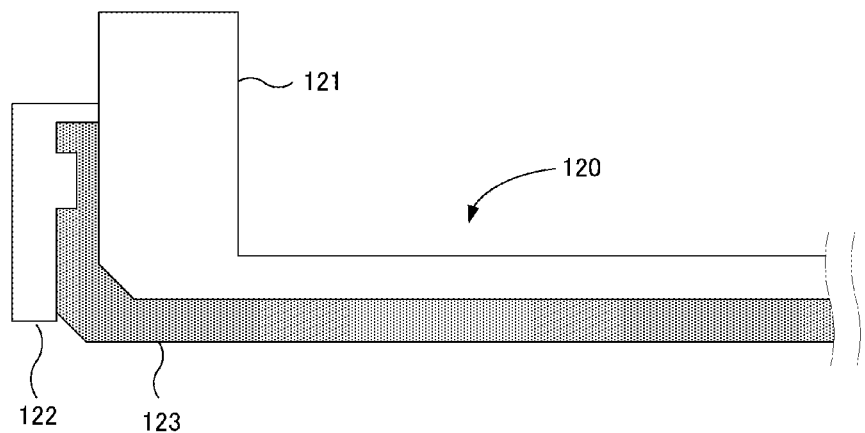
FIGS. 12A to 12C illustrate modified embodiments of the present invention.
Figure 12B:
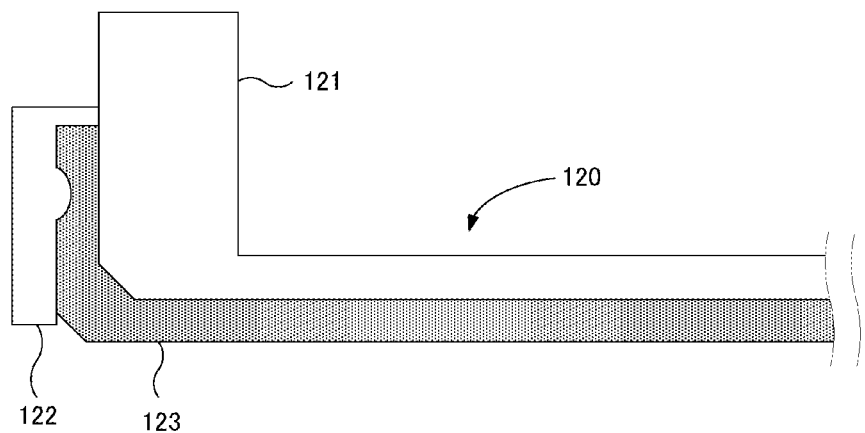
Figure 12C:
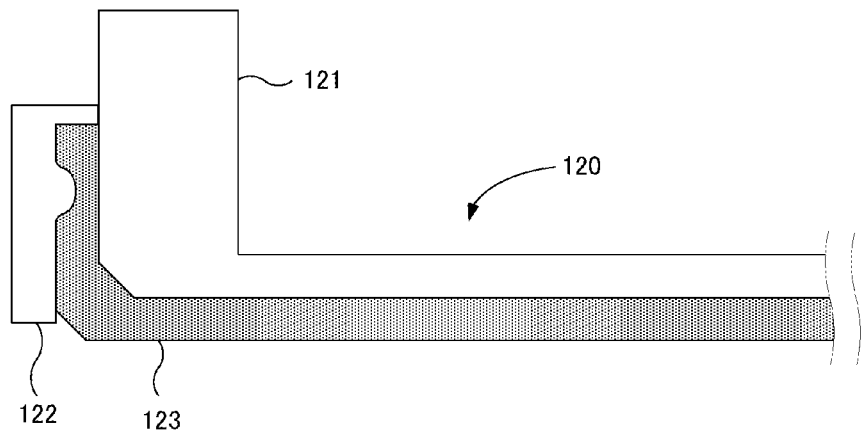

Also, as shown in FIGS. 12A to 12C, the earth ring 122 may be formed with projections having various shapes. Specifically, the earth ring 122 may be formed with a rectangular projection (FIG. 12A), a semi-circular projection (FIG. 12B) or a recess having other shape (FIG. 12C). In this case, the projection bites the lining material 123, so that the compression rate of a part of the lining material 123 corresponding to the projection is increased and the liquid tightness is improved.

In the meantime, the thickness of the earth ring 122 is changed in the diametrical direction. However, the thickness of the earth ring 122 may be changed in a circumferential direction. Alternatively, the thickness of the flange part 121 of the measurement tube 120 may be changed.

What is claimed is:

1. An electromagnetic flow meter comprising:
a measurement tube having a flange part, the flange part being configured to be coupled to a piping-side flange by a bolt fastening;
a lining material configured to cover an inside of the measurement tube and an inner periphery area having a predetermined diameter of a coupling-side surface of the flange part, and
an earth ring configured to be placed between the flange part and the piping-side flange,
wherein the earth ring has a ring plate part and a wall part formed along an outer periphery of the ring plate part
wherein a thickness of the earth ring is changed on a surface thereof facing the lining material.

2. The electromagnetic flow meter according to claim 1, wherein an inner diameter of the wall part is configured to be greater than the predetermined diameter of the coupling-side surface of the flange part covered by the lining material.

3. The electromagnetic flow meter according to claim 2, wherein the lining material is contacted to the wall part by deformation thereof caused due to compression, when the flange part and the piping-side flange are coupled by the bolt fastening.

4. The electromagnetic flow meter according to claim 2, wherein the lining material is contacted to the wall part by deformation thereof caused due to a pressure applied from a fluid to be measured, after the flange part and the piping-side flange are coupled by the bolt fastening.

5. The electromagnetic flow meter according to claim 1, wherein the earth ring is thicker at an outer peripheral part thereof than at an inner peripheral part thereof.

6. The electromagnetic flow meter according to claim 1, wherein the thickness is changed by a recess or projection formed at the earth ring.

7. An electromagnetic flow meter comprising:
a measurement tube having a flange part, the flange part being configured to be coupled to a piping-side flange by a bolt fastening;
a lining material configured to cover an inside of the measurement tube and an inner periphery area having a predetermined diameter of a coupling-side surface of the flange part;
an earth ring configured to be placed between the flange part and the piping-side flange, and
an annular wall ring configured to be placed between the flange part and the earth ring and having an inner diameter greater than the predetermined diameter of the coupling-side surface of the flange part covered by the lining material,
wherein the earth ring and the annular wall ring are separately-formed.

8. The electromagnetic flow meter according to claim 7, wherein the lining material is contacted to the wall ring by deformation thereof caused due to compression, when the flange part and the piping-side flange are coupled by the bolt fastening.

9. The electromagnetic flow meter according to claim 7, wherein the lining material is contacted to the wall ring by deformation thereof caused due to a pressure applied from a fluid to be measured, after the flange part and the piping-side flange are coupled by the bolt fastening.

10. The electromagnetic flow meter according to claim 7, wherein a surface of the flange part facing the earth ring or a surface of the earth ring facing the flange part has a recess configured to fit therein the wall ring.

11. The electromagnetic flow meter according to claim 7, wherein a thickness of the earth ring is changed on a surface thereof facing the lining material.

12. The electromagnetic flow meter according to claim 11, wherein the earth ring is thicker at an outer peripheral part thereof than at an inner peripheral part thereof.

13. The electromagnetic flow meter according to claim 11, wherein the thickness is changed by a recess or projection formed at the earth ring.

14. An electromagnetic flow meter comprising:
a measurement tube having a flange part, the flange part being configured to be coupled to a piping-side flange by a bolt fastening;
a lining material configured to cover an inside of the measurement tube and an inner periphery area having a predetermined diameter of a coupling-side surface of the flange part, and
an earth ring configured to be placed between the flange part and the piping-side flange,
wherein the flange part has a projection which is circumferentially formed on the coupling-side surface of the flange part to surround the lining material.

15. The electromagnetic flow meter according to claim 14, wherein a thickness of the earth ring is changed on a surface thereof facing the lining material.

16. The electromagnetic flow meter according to claim 15, wherein the earth ring is thicker at an outer peripheral part thereof than at an inner peripheral part thereof.

17. The electromagnetic flow meter according to claim 15, wherein the thickness is changed by a recess or projection formed at the earth ring.

* * * * *